Sept. 18, 1962   W. R. JOHNSON ETAL   3,054,481
PREFABRICATED BUILDING
Filed Feb. 25, 1959   5 Sheets-Sheet 2

INVENTORS
WILLIAM R. JOHNSON
ERLAND L. WEST
BY
ATTORNEY

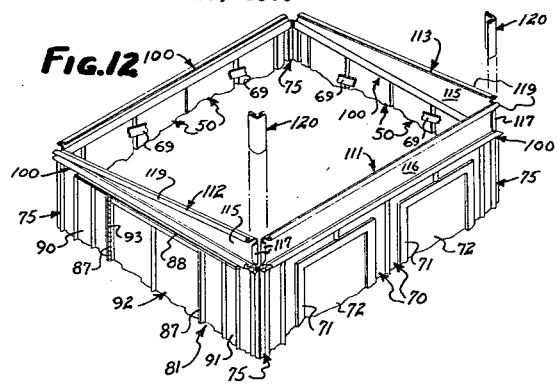
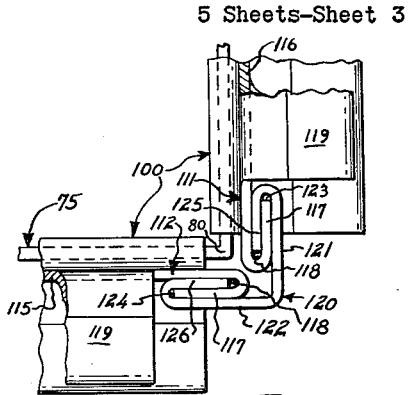
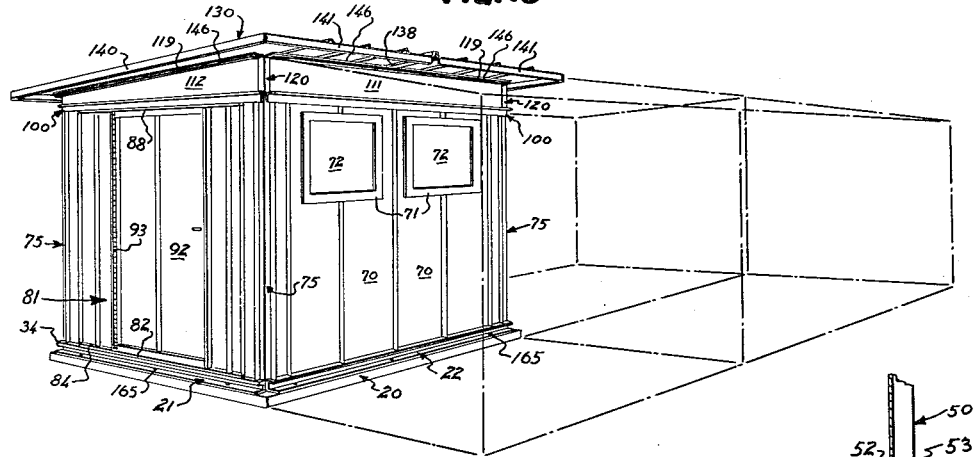
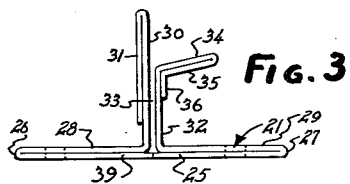
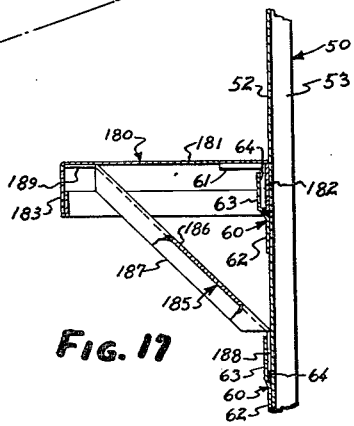
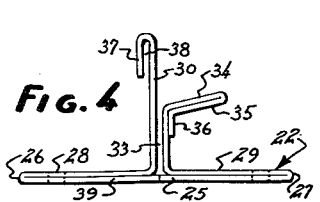

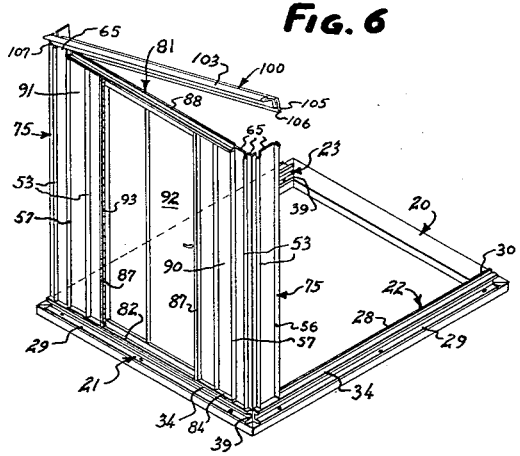

Sept. 18, 1962 W. R. JOHNSON ETAL 3,054,481
PREFABRICATED BUILDING
Filed Feb. 25, 1959 5 Sheets-Sheet 5

INVENTOR.
WILLIAM R. JOHNSON
ERLAND L. WEST
BY
ATTORNEY

United States Patent Office 3,054,481
Patented Sept. 18, 1962

3,054,481
PREFABRICATED BUILDING
William R. Johnson and Erland L. West, Santa Cruz, Calif., assignors to Metal Buildings, Inc., Santa Cruz, Calif., a corporation of California
Filed Feb. 25, 1959, Ser. No. 795,474
14 Claims. (Cl. 189—2)

This invention relates to improvements in prefabricated utility buildings. More particularly, it relates to an all-metal knockdown building that is capable of rapid assembly and disassembly, and is held together without any bolts, screws, nails, or rivets.

The term "utility buildings" comprises storage sheds for tools, garden equipment, or other supplies, swimming-pool cabanas, playhouses, and countless other structures. The need for them is widespread, and many attempts have been made to provide preformed assemblies to meet the need. Several such sheet-metal buildings have appeared on the market but the one of this invention has many unique features that contribute to its unusual strength per weight, its stability, its economy, and its ease of assembly.

The unique fact that the building of this invention is assembled and held together without a single bolt, nut, screw, nail, or rivet enables it to achieve several important objects. An entire building of this invention can be erected in less than one hour by two men, and they need no tools, though a mallet may further speed the assembly. The building may be taken down even more quickly. This makes it feasible to use the building as a seasonal shed on a farm, for it can be dismantled rapidly and stored in a small space when it is not needed. It also means that every suburbanite can put up the building by himself or with a single helper without any special tools or skill.

Unusual strength is imparted to the building by novel formation of its parts. Such formation enables its sheet-metal panels to support considerable stresses without any special supporting framework, thereby contribuiting to the economy of this building. Additional strengthening is imparted by the novel way in which the elements fit together and by the novel fastening connections.

Thus, the general objects of the invention are to provide a rapidly assembled prefabricated building, a building that can be quickly taken apart and stored as pieces and later re-erected, a building that is economically manufactured from metal, a building that is exceptionally strong and stable for its weight, and one that requires no special tools, extra fasteners, or skill to assemble.

Other objects and advantages of the invention will appear from the following description of a preferred embodiment thereof.

In the drawings:

FIG. 3 is an enlarged view in elevation and in section of one form of base receptacle.

FIG. 4 is a view like FIG. 3 of another form of base receptacle.

FIG. 5 is a view like FIGS. 3 and 4 of another form of base receptacle.

FIG. 6 is a perspective view of the building at an early stage of its erection.

FIG. 7 is an enlarged fragmentary view in elevation and in section showing the insertion of a panel into the base receptacle, adjacent an already-installed panel, taken generally along the line 7—7 in FIG. 8.

FIG. 8 is an enlarged fragmentary top plan view of one corner portion of the building at the same stage of erection as that shown in FIG. 6 and showing the base structure, the thickness of the sheet metal in this and some of the other views being exaggerated to increase the clarity of the view.

FIG. 9 is a view similar to FIG. 6 showing the building at a later stage of its erection.

FIG. 10 is a fragmentary enlarged view of a panel-stiffener bar as it is being inserted in place at the top of some wall panels.

FIG. 11 is a view like FIG. 7 with the panel-stiffener bar inserted.

FIG. 12 is a fragmentary perspective view of the top portion of the building at a subsequent stage of its erection, with corner locking brackets about to be installed.

FIG. 13 is a fragmentary enlarged top plan view of one corner of the upper end of the building at the completion of the stage shown in FIG. 12, illustrating a roof-supporting corner.

FIG. 15 is a perspective view of a completed building assembly, indicating also in broken lines how the building may be multiplied in size.

FIG. 17 is a view in elevation and in section of a shelf supported by the building wall.

Figure 1:
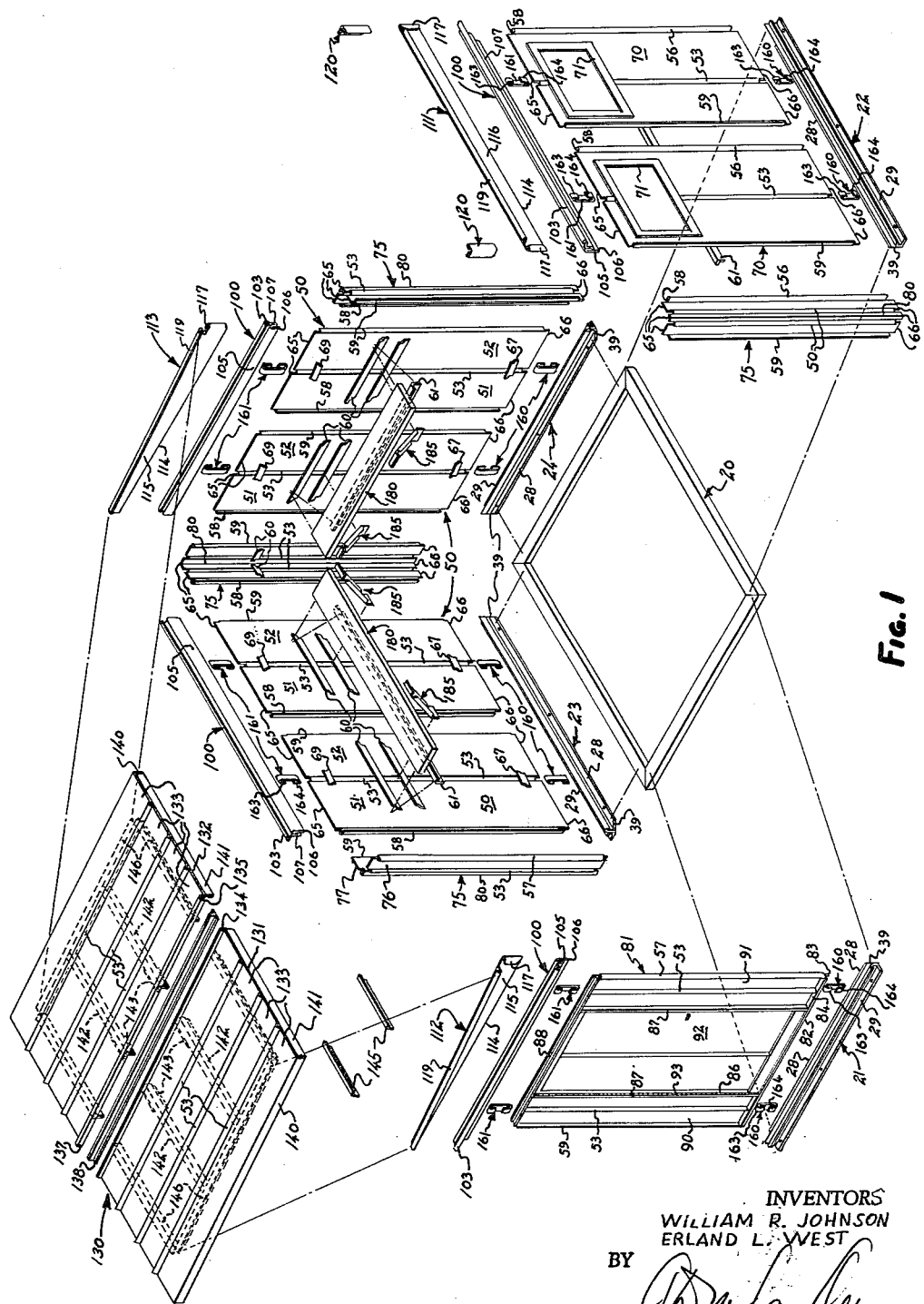
FIG. 1 is an exploded view in perspective of a building embodying the principles of this invention.
Figure 2:
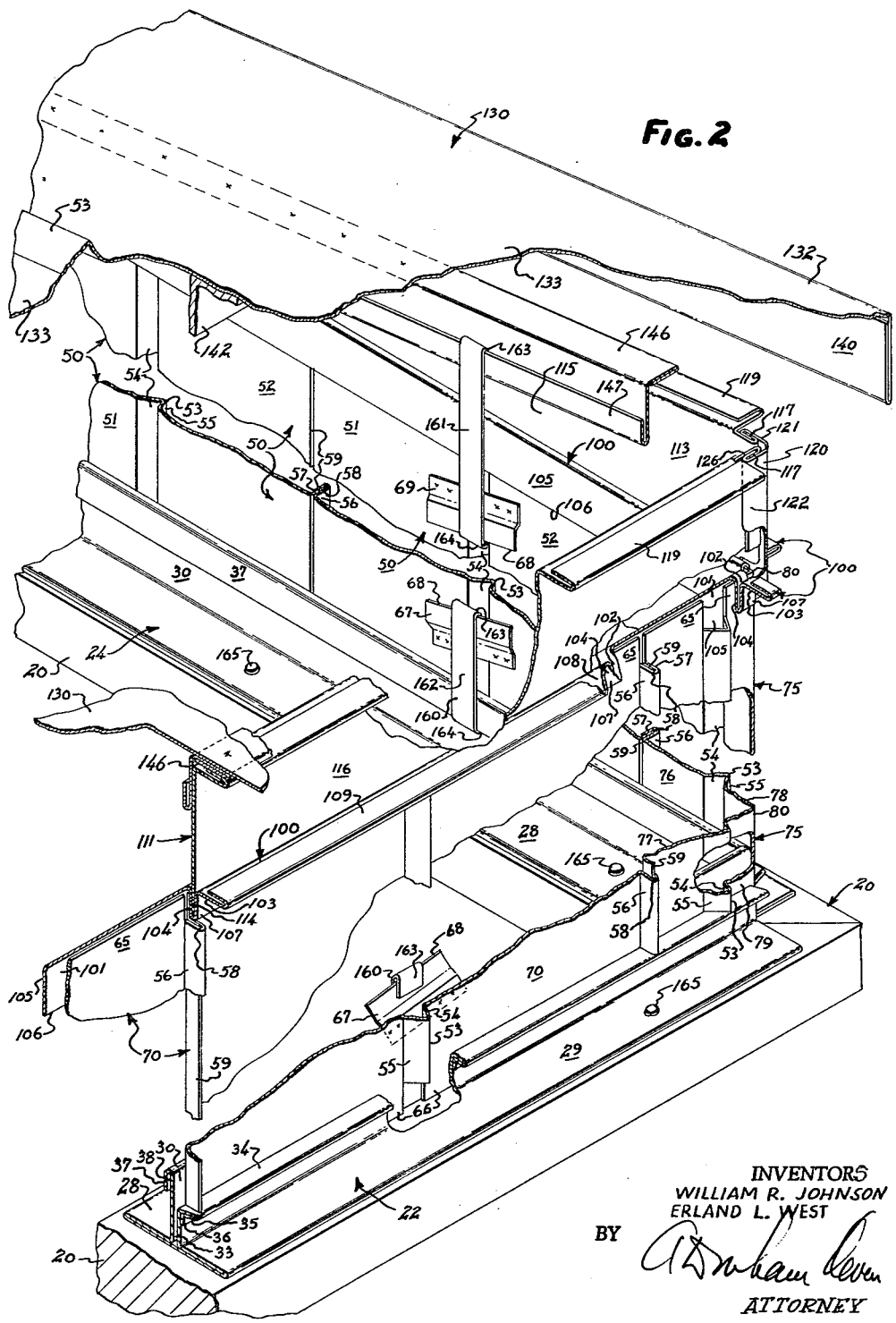
FIG. 2 is a perspective view of a corner of the assembled building of FIG. 1, with parts broken away and shown in section to disclose other parts behind them. The view is also broken in the middle to conserve space.
Figure 16:
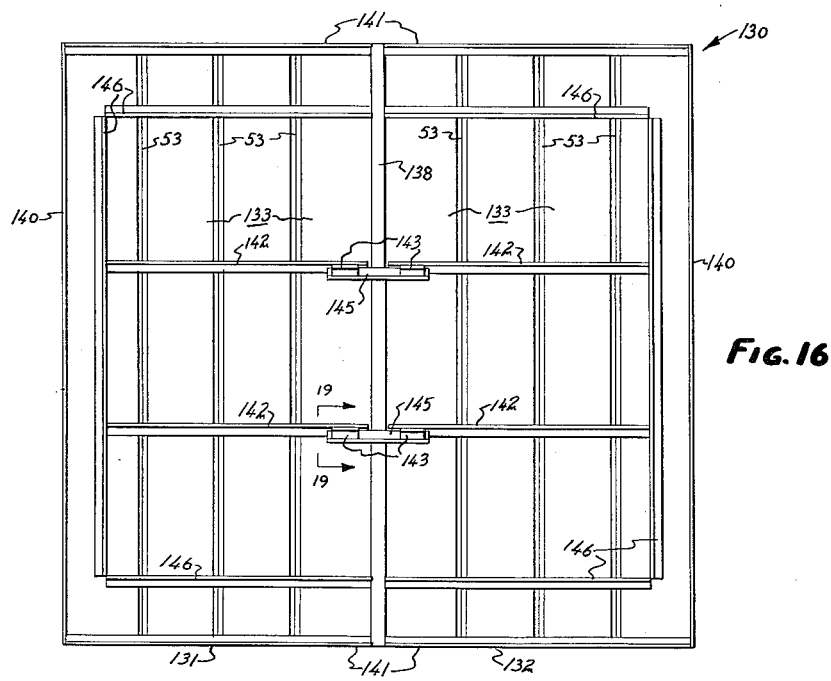
FIG. 16 is a bottom plan view looking up at the bottom of the roof.
Figure 18:
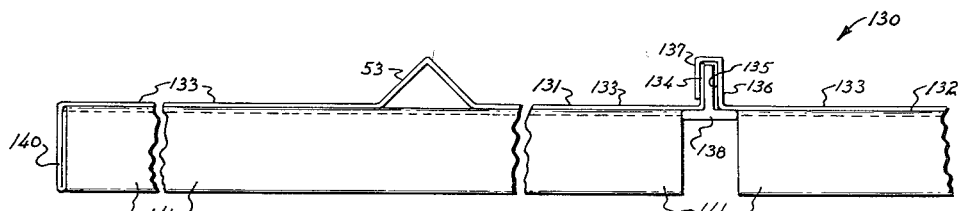
FIG. 18 is an enlarged fragmentary view in end elevation of the roof of FIG. 16, broken at two places and at one end.
Figure 14:
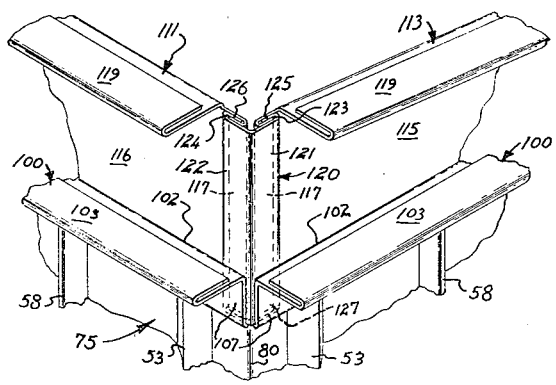
FIG. 14 is a fragmentary enlarged view in perspective of the corner of FIG. 13.
Figure 19:
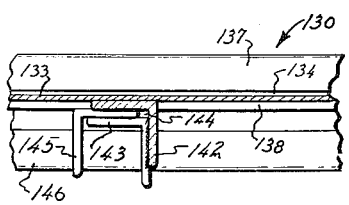
FIG. 19 is an enlarged view in section taken along the line 19—19 in FIG. 16.

*Footing, Foundation, Floor, or Sill (See FIGS. 1–6, 9 and 11)*

Any level slab, floor, footing or foundation can support the building, whether it be of dirt, wood, or concrete. For example only, the building is illustrated as resting on a 2" x 4" wooden sill 20 that has been properly leveled before the building is constructed thereon.

*The Base Members (See Especially FIGS. 1–8)*

To begin assembly, four base receptacles 21, 22, 23, and 24 are laid loosely on the sill 20. Each base receptacle comprises an elongated unitary sheet-metal member formed into shape by bending. They may all be identical, as are two of the base receptacles 22 and 23 in the house shown in the drawings (see FIG. 4), but two other forms are illustrated by the receptacles 21 and 24 (see FIGS. 3 and 5), because the base receptacles are a very important part of the combination of this invention, and the modifications are possible.

The base receptacle 21 may be bent to the cross-sectional shape shown in FIGS. 3 and 7 where there is a flat bottom 25 joined by edge-defining bends 26 and 27 to upper base flanges 28 and 29. The inside base flange 28 is joined to an inner upright portion 30 that is strengthened by a paralleling bent-down upright portion 31. The outside base flange 29 is joined to an outer shorter upright portion 32 that is spaced from the upright portion 30 to define a groove 33 therebetween. The portion 32 leads to an outwardly extending inclined portion 34 that meets it at a rather flat angle and is given support by an inwardly extending paralleling portion 35 and by a short downwardly extending doubling end portion 36. However, this receptacle 21 is preferably made like the receptacles 22 and 23 in FIG. 4.

The base receptacles 22 and 23 (FIG. 4) are identical in cross section with the receptacle 21 except that in place of a portion 31 doubling substantially the full height of the portion 30, a short hook portion or anchor strip 37 is provided, with a narrow groove 38 defined between the portions 37 and 30, for a reason to be explained later. In many instances it is preferable that all four receptacles 21, 22, 23, 24 be like this preferred form, so that advantage can be taken of having all identical parts (except for length) and so that advantage can be taken of the hook portion 37.

The rear base receptacle 24 is preferably like the receptacles 22 and 23, but FIG. 5 illustrates a variation 24', which may be used in some structures where the hook portion 37 is not needed. The corners 26 and 27 connect the base bottom 25 to upper base flanges 40 and 41 whose inner ends are somewhat further apart than those of the flanges 28 and 29. The flange 40 leads to an upright portion 42 that is strengthened by an inclined bead portion 43 that is doubled for strengthening by a return portion 44 and ends in a downwardly extending doubling portion 45. Similarly, the flange 41 leads to a shorter upright portion 46, a bead portion 47, a doubling bead portion 48 and a doubling vertical portion 49. Again the vertical groove 33 is present. In fact, in all instances the base receptacles have a shape generally like an inverted T with the vertical portion centrally grooved.

The doubling, the beads, and the bends, all contribute to making strong structural members out of light gauge sheet metal, so that these receptacles are far less expensive and lighter than would be cast members, and they are also more suited to use herein because their natural springiness enables them to compensate for slight irregularities in the panels. The inside ends 39 of the receptacles 21, 22, 23, 24 are cut to mate together, as shown in FIGS. 1 and 8.

The Solid Wall Panels (See Especially FIGS. 1, 2, 8, and 17)

The sides of the building are built up of various types of panels that are supported on the base receptacles 21, 22, 23, 24 by fitting in the grooves 33. First to be considered will be solid wall panels 50, four of which are shown in FIG. 1. Each panel 50 is made from sheet metal and comprises two flat panel portions 51 and 52 joined by a strengthening V-grooved rib 53, that comprises a pair of converging angular portions 54 and 55, extending outwardly at about 45° (see FIGS. 2 and 8) so that the groove side lies on the inside of each panel. This structure adds considerably to the strength and stiffness of the panels. The free end of the panel portion 51 terminates in an outwardly bent flange portion 56 and an inwardly bent doubling portion 57, providing a locking groove 58 therebetween. The end of the panel portion 52 has a single outwardly extending flange 59 that fits into and locks into the groove 58 of the succeeding panel (see FIGS. 2 and 8).

Two parallel horizontally extending locking brackets 60, formed of separate pieces of sheet metal, are welded to the inner wall of each panel 50, preferably somewhat above the middle, bridging the rib 53 and connecting panel portions 51 and 52. Later an angle iron 61 will be inserted in some of these brackets 60 to stiffen and strengthen some or all the panels on each wall of the building, and shelves may be installed in others. Each bracket 60 (see FIG. 17) includes a base strip 62 welded to the panel 50 and an offset strip 63 providing a receptacle 64 between itself and the panel wall for accommodation of the angle iron 61 and shelf anchors.

The ribs 53 and the end flanges 56, 57, and 59 stop short of the upper and lower edges 65, 66 of each panel to give upper and lower marginal portions that are planar. The lower edges 66 are to be fitted into the base grooves 33.

These panels forming side walls have inclined anchor strips 67 (see FIG. 2) adjacent and above their lower edges 66. The strips 67 are shaped generally like the locking brackets 60 and like them are welded across the groove defined by the rib 53, bridging from panel portions 51 to panel portion 52, but, unlike them, the strips 67 are inclined so that their offset upper edge 68 serves as a cam in a manner to be described later. Similar inclined strips 69 are located near the upper edge 65, and these are inverted so that the cam edges 68 are at the bottom.

The Window Panels (FIGS. 1, 2, 9, 12, 15, and 16)

Small sheds often do not need windows, and in that type of structure the solid panels 50 are used on three sides. Where windows are desired, window panels 70 are provided. They are like the panels 50 in every major respect except for the presence of a window frame 71 and window 72. The frame 71 may be conventional and may be simply welded in place at an opening cut for the purpose in a panel 50. The glazing may be done after assembly. The ribs 53, brackets 60, and anchor strips 67 are present, and their ends have the same flanges 59 and grooves 58, and their lower edges 66 and upper edges 65 are also like those of the panels 50.

The Corner Panels (FIGS. 1, 2, and 6-9)

Four identical corner panels 75 are provided. Flat portions 76 and 77 are divided from flat portions 78 and 79 by ribs 53 like those on the panels 50 and 70 and the flat portions 78 and 79 meet at a right-angle corner 80 (see FIGS. 2 and 8). Like the panels 50 and 70, the corner panels 75 have end grooves 58 and flanges 59, two linear top and bottom edges 65 and 66 meeting at the corner 80 and brackets 60. The anchor strips 67 and 69 may be omitted from the corner panels 75.

The Door Panel (FIGS. 1 and 6-9)

A door panel 81 is an important part of the combination. It includes a cast-iron bottom sill 82 that is T-shaped as seen in cross section, with a lower vertical portion 83 that fits in a base groove 33 to lock the panel 81 to the base receptacle 21. The sill 82 has a horizontal portion 84 and an upper vertical portion 85 that form part of a door frame 86. Two vertical T-shaped irons 87 form the sides and a top iron 88 bridges them and has an upwardly projecting edge 89. Panel sections 90 and 91 of sheet metal are welded to the door frame 86. They are like the panels 50 structurally and functionally, and a locking end flange 59 and groove 58 are again provided at opposite ends of the panel 81, as are top edges 65, bottom edges 66, and V-groove ribs 53 and brackets 60, 67, and 69. Any suitable door 92 may be secured in the frame 86 by a hinge 93, preferably a piano hinge.

Installation of the Panels in the Base Receptacles (See FIGS. 6-9)

Installation of the panels 50, 70, 75, and 81 begins while the base receptacles 21, 22, 23, and 24 are still loose on the sill 20. The door panel 81 is usually installed first, the downwardly extending portion 83 of its door frame 86 and the lower edges 66 of its sheet-metal portions 90 and 91 being forced into the groove 33 of the receptacle 21. They fit snugly, and the panel 81 is then held upright by one man while another man puts in the adjacent panels, which may, as shown in the drawings, both be corner panels 75, although in larger buildings they may be wall panels 50 or window panels 70. The corner panels 75 are inserted by placing their lower edges 66 in the groove 33 of the receptacle 21 and also in the grooves 33 of the adjoining base receptacles 22 or 23, so as to join the bases 21, 22, and 23 together. The corner panels 75 are joined to the door panel 81 by fitting the groove 58 of one corner panel 75 around the flange 59 of the door panel 81, and by inserting the flange 59 of the other corner panel 75 into the groove 58 of the door panel 81. To do this, the panel 75 may be tipped as shown in FIG. 7 to start the lower ends of the groove 58 and flange together and then straightening it up, completing the juncture at the same time. They are fit in snugly and knocked down with a mallet, if necessary. The alignment of the base receptacles 22 and 23 may be completed by sliding them relatively to the corner panels 75 after this installation. The panels 75 and 81 may then be braced by bridging an angle iron 61 across one bracket 60 on the door panel 81 and one on a corner panel 75. This is then repeated for the other corner panel 75.

Successive panels 50, 75, and 70 are added around the house in the same manner. In all of them the lower edges 66 are inserted into the grooves 33 and retained thereby the vertical portions of the base receptacles 22, 23, and 24. All the panels are locked together by the slip fit of the flanges 59 in the grooves 58, inserted as shown in FIG. 7. At each side wall, one or more angle irons 61 extends from a bracket 60 on one corner panel 75 to another bracket 60 on the other corner panel 75 and is locked to brackets 60 at each panel 50 or 70 in between, thereby giving a rigid support to the walls about midway between their upper and lower edges 65 and 66, or slightly thereabove.

*Top Edge Stiffener Bars (FIGS. 1, 2, 6, and 9–11)*

As each wall is erected or after all have been erected, the top edges 65 of all the panels of each wall are locked together by a stiffener bar 100. This bar comprises a sheet-metal member bent to the shape shown in FIGS. 10 and 11, to provide two grooves 101 and 102, and a strengthening rib 103. The grooves 101 and 102 are vertical and are separated by a vertical wall 104. The groove 101 is open at the bottom and is defined by vertical walls 104 and 105, the latter having a lower edge 106, extending down below the remainder, to give tighter gripping action. The groove 102 is open at the top and is defined by vertical walls 104 and 107. The rib 103 is horizontal and is defined by walls 108 and 109, the wall 108 being joined perpendicularly to the wall 107. The stiffener bar 100 is inserted as shown in FIG. 11, at an angle, and the groove 101 is made to engage the upper edge 65 of all the panels along that side wall, from end to end. At the door panel 81, a portion of the groove 101 is engaged by the upwardly extending portion 89 of the top iron 88 (FIG. 6).

The lightweight sheet-metal bar 100 is given great strength by its described shape, without completely losing its resiliency, and the necessity for welds or machined grooves is avoided. Its L-shape provided by the rib 103 gives it plenty of the needed rigidity. Its installation completes the reinforcement of the wall panels.

*The Roof-Support Members (FIGS. 1, 2, 12, 13, and 14)*

In order to give a pitch to the roof, three roof-support members 111, 112, and 113 are provided. The member 111 is used at the high side of the roof, and the members 112 and 113 are symmetrically inclined members. Each sheet-metal roof-support member 111, 112, and 113 has a lower edge 114 that fits down into the groove 102 of a roof-stiffening bar 100. Above their lower edges 114, the members 112 and 113 have a triangular panel portion 115 building from zero width up to the width of a rectangular panel portion 116 on the member 111. The high end of each panel 112 and 113 and both ends of the panel 111 are provided with turned-over edges 117 providing a groove 118. At their upper edges, each panel 111, 112, and 113 is provided with horizontal doubled flanges 119.

The two corner locking members 120 comprise sheet-metal angles (see FIG. 13) with two sides 121 and 122 and grooves 123 and 124 provided by the curling over the sides 121 and 122 into portions 125 and 126. These members 120 are inserted from above, with portions 125 and 126 engaging in the grooves 118, while the grooves 123 and 124 embrace the edges 117 of the roof-support members, and thus the three members 111, 112, and 113 are locked together. The portions 125 and 126 stop short of the lower edges 127 of the members 120, and these edges extend down into the groove 102 of the bars 100, locking with them and stopped by them.

*The Roof (FIGS. 1, 2, 15, 16, 18, and 19)*

The roof 130 is made in a plurality of sections, except where the building is very small. The illustrated roof 130 has two sections 131 and 132. Both are sheet-metal panels resembling the wall panels 50, in that they have flat portions 133 joined by V-groove ribs 53, which in this instance project upwardly. Also, one edge of the section 131 has a vertical flange 134 like the flange 59, and one edge of the section 132 has a vertical groove 135 like the groove 58, provided by doubled flanges 136 and 137. The two sections 131 and 132 thus interlock easily. Additional support at this point is provided by driving in an inverted T-shaped iron 138 with its vertical portion in the groove 135 and its horizontal portion supporting both sections 131 and 132.

The edges parallel to the flange 134 and groove 135 are provided with a downwardly extending lip 140 embodying a double flanging of the sheet metal. The other two edges are also provided with a lip, by welding a similarly doubled sheet-metal angle 141 thereto. Each panel 131, 132 is further strengthened by one or more angle irons 142 (FIG. 19) running transverse to the edges 134, 135, and 140. To each of these, adjacent the juncture, is welded another angle iron 143 with one side spaced from the corresponding side of the iron 142 to provide a groove 144, and the roof panels 131, 132 are additionally linked and strengthened by a short angle iron 145 that bridges in-line pairs of irons 143 and is locked in the grooves 144.

The roof 130 is also provided with a depending rectangular flange 146, provided by strips of angle iron each made from doubled strip metal and welded to the roof panels 131, 132. This flange 146 fits down just inside the roof-support panels 111, 112, and 113 and the bar 100 at the low edge. The flanges 146 of at least the upper and lower sides of the roof are provided with hook portions 147.

*The Securing Clips 160 and 161 (FIGS. 1 and 2)*

Clips 160 and 161 comprise strips 162 of sheet metal with turned over hook-like ends 163 and 164. The hook-like lower ends 164 of the clips 160 are engaged in the grooves 38 (FIG. 4) and the upper ends 163 are started at the low end of the inclined cam edge 68 of the bracket 67. The clip 160 is then driven on by a mallet until it is quite secure. It is then tight and locks its panel to its base receptacle.

The clips 161 are like the clips 160 but are larger. Their upper hooked end 163 is engaged in the portion 147 of the flange 146, its lower end is started on the closest portion of the cam edge 68 of the bracket 69, and it is driven in to hold the roof 130 down securely.

*Fastening the House to the Sill 20 (FIG. 2)*

The alignment of the house may now be checked. Then it is fastened securely to the base sill 20, as by nails 165 or by bolts, if desired. The house is now completely assembled, and may be disassembled in reverse order.

*Shelving (FIGS. 1 and 17)*

For storage purposes, shelves 180 are useful. The shelf proper has a flat shelf portion 181 with a depending rear flange 182 that engages in the upper bracket 60, preferably in addition to and behind an angle iron 61. At its forward end it has a down-turned lip 183. A pair or more of shelf supports 185 comprise sheet metal members with a main portion 186, edge flanges 187, an end flange 188 that is inserted in the lower bracket 60 (by itself or in addition to an angle iron 61), and a supporting flange 189 at its upper end. By putting the support members 185 in lower brackets 60 and the shelf flange 182 in upper brackets 60, assembly is elementary.

*Brief Review of Assembly*

Although the assembly has been described step by step in detail, it will be briefly reviewed here in one place.

The four base receptacles 21, 22, 23, and 24 are laid loosely on the sill 20, preferably over a ribbon of calking compound. The door panel 81 is erected by inserting its lower edges 66 and 83 in the groove 33 of the receptacle 21. Corner panels 75 are inserted, as in FIG. 7, with one lower edge 66 in the groove 33 of the receptacle 21 and with the grooves 58 and flanges 59 of the panels 75 and 76 interlocked. The other edges 66 of the corner panels 75 are installed in the ends of the base receptacles 22 and 23. Other panels 50, 70, and 75 are installed in the same manner, with the flanges 59 and grooves 58 interlocked and the edges 66 in the proper grooves 33. All the panels in each wall are linked and stiffened by inserting angle irons 61 in the brackets 60. The top edges 65 are then stiffened by insertion of the stiffener bars 100, the edges 65 fitting in the grooves 101.

Along three of the walls, the roof-support members 111, 112, and 113 are inserted, with their lower edges 114 fitting in the grooves 102 of the stiffener bars 100. The corners of the member 111 are joined to one corner of each member 112 and 113 by sliding down into place the corner locking members 120. The lower edges 127 of the locking members 120 also are locked into the grooves 102 of the bars 100.

The roof panels 131 and 132 are put together by inserting the flange 134 into the groove 135 and the supporting angle iron 138 is driven into the groove 135. Then the roof 130 is lifted up over the building and set in place with its flanges 146 just inside the top edges of the members 111, 112, and 113 and the bar 100 at the lower edge not having any of members 111, 112, and 113.

The clips 160 and 161 are then driven into place to secure the panels to the base receptacles and the roof to the panels, by using the inclined brackets 67 and 69. Finally, the base receptacles 21, 22, 23, and 24 are nailed, bolted, or otherwise secured to the sill 20. Calking may then be applied around the upper outside vertical edge of the base receptacles.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A knockdown building comprising: a series of base receptacles of inverted T-shape in cross section each with a central vertical groove in the vertical trunk thereof and a hook-like flange along the upper inside edge; a series of integral sheet-metal panels, each having a locking flange extending along one vertical edge and a locking groove along the other vertical edge, so that successive panels are joined together by interlocking a locking flange in a locking groove to define the four walls of the building, said grooves and flanges stopping short of upper and lower planar edges, said lower edges fitting in the grooves of said receptacles, said panels having lengthwise pocket-like horizontal brackets between said upper and lower edges and inclined brackets adjacent their upper and lower edges; angle irons linking all said horizontal brackets of the panels on each side of the building; upper edge stiffening bars having a groove open at its lower end receiving the upper edges of said panels and stiffening them; a sheet-metal roof having a depending flange spaced in from its edges and fitting just inside the upper ends of the building walls, said depending flange having a hook portion thereon; and clips comprising strips of metal with hooked ends linking the hook portion of said roof flanges to said upper inclined brackets on said panels and linking the hook portion of said base receptacles to said lower inclined brackets on said panels, whereby said building is assembled without screws, nails, or bolts.

2. A knockdown building comprising: a series of base receptacles each formed from a single piece of sheet metal bent to provide a double thickness beam of inverted T-shape in cross section with a downwardly extending vertical groove in the vertical branch of the T and with a hook-like turned flange along the upper inside edge; a series of integral sheet-metal panels, each comprising a single piece of sheet metal formed to provide plurality of flat wall portions joined to each other by a vertical V-grooved stiffening rib with the V extending outwardly, each panel having its edges providing means for interlocking with sucessive panels on each side and having upper and lower planar edges, said lower edges providing a single thickness of sheet metal fitting in the grooves of said receptacles; upper edge stiffening bars each comprising a single piece of sheet-metal formed to provide a groove open at its lower end, and an outwardly extending horizontal strengthening bead, the groove receiving the single thickness of sheet metal comprising the upper edges of said panels and stiffening them; and a roof made up of a plurality of panels of sheet-metal each panel comprising a single piece of sheet metal having flat portions joined by V-groove-defining upwardly extending ribs, successive panels being interlocked at their mating edges, said roof having a depending lip therearound and a depending flange spaced in from said lip and fitting just inside the upper ends of the building walls.

3. The building of claim 2 wherein the under side of said roof panels are stiffened by angle irons welded thereto, a second angle iron being welded to a portion of one branch of each stiffening angle arm and spaced from the other branch to provide a groove, said panels being joined also by angle irons bridging between grooves of successive panels.

4. The building of claim 2 wherein the roof has a pitch provided by said stiffening bars having outer grooves open at their upper ends, three roof-support panels of sheet metal fitting in the outer grooves of stiffening bars, one being rectangular and the other being triangular to give pitch to the roof and having locking edges at the high ends of the triangular panels and at both ends of the rectangular panel, and corner-locking members engaging said locking edges and joining said rectangular panel to said triangular panels, and extending into the outer grooves of said stiffening bars.

5. A knockdown building comprising: a series of base receptacles formed from sheet metal bent to provide a double thickness beam of inverted T-shape in cross section with a central vertical groove open at its upper end and a hook-like turned down flange along their upper inside edge; a series of integral sheet-metal panels including wall panels, a door panel, and corner panels, each comprising at least two flat wall portions joined to each other by a V-grooved stiffening rib extending outwardly, each panel having a locking flange extending along one vertical edge and a locking groove along the other vertical edge, so that successive panels are joined together by interlocking a locking flange of one panel in a locking groove of the next panel, said grooves, flanges, and ribs stopping short of upper and lower planar edges, said lower edges fitting in the grooves of said receptacles, said panels having lengthwise pocket-like horizontal brackets between said upper and lower edges and inclined brackets adjacent their upper and lower edges; angle irons fitting in and linking horizontal brackets of different panels; upper edge stiffening bars comprising sheet-metal members formed to provide an inner groove open at its lower end, an outer groove open at its upper end and and outwardly extending horizontal strengthening bead, the inner groove receiving the upper edges of said panels and stiffening them; three roof-support panels of sheet metal fitting in the outer grooves of stiffening bars, one being rectangular and the other two being triangular to give pitch to the roof and having turned over edges providing locking means at the high end of each triangular panel and at both ends of the rectangular panel; corner-locking members engaging said locking means and joining said rectangular panel to said triangular panels; a roof made up of a plurality of panels of sheet-metal each having flat portions joined by V-groove-defining upwardly extending ribs, successive panels being joined by locking flanges and grooves, said roof having a depending flange spaced in from its edge and fitting just inside said roof-support panels and one said stiffening bar, said depending flange having a hook portion thereon; and clips comprising strips of metal with hooked ends linking the hook portion of said roof flanges to the upper said inclined brackets on said panels and linking the hook portion of said base receptacles to the lower said inclined brackets on said panels, whereby said building is assembled without screws, nails, or bolts.

6. A knockdown building comprising: a series of base receptacles formed from sheet metal bent to provide a double thickness beam of inverted T-shape in cross section with a central vertical groove open at its upper end, some of said receptacles having a hook-like turned down flange along their upper inside edge; a series of integral sheet-metal panels including wall panels, a door panel, and corner panels, each comprising at least two flat wall portions joined to each other by a V-grooved stiffening rib extending outwardly, each panel having a locking flange extending along one vertical edge and a locking groove along the other vertical edge, so that successive panels are joined together by interlocking a locking flange in a locking groove, said grooves, flanges, and ribs stopping short of upper and lower planar edges, said lower edges fitting in the grooves of said receptacles, said panels having lengthwise pocket-like horizontal brackets between said upper and lower edges and some of said panels having inclined brackets adjacent their upper and lower edges; angle irons linking all said horizontal brackets of the panels on each side of the building; upper edge stiffening bars comprising sheet-metal members formed to provide an inner groove open at its lower end, an outer groove open at its upper end and an outwardly extending horizontal strengthening bead, the inner groove receiving the upper edges of said panels and stiffening them; three roof-support panels of sheet metal fitting in the outer grooves of stiffening bars, one being rectangular and the other two being triangular to give pitch to the roof and having at the high ends of the triangular panels and at both ends of the rectangular panel, turned over edges providing locking means; corner-locking members engaging said locking means and joining said rectangular panel to said triangular panels; a roof made up of a plurality of panels of sheet-metal each having flat portions joined by V-groove-defining upwardly extending ribs, successive panels being joined by locking flanges and grooves, with a supporting T-shaped angle iron in said groove to give additional support, said roof having a depending lip therearound and a depending flange spaced in from said lip and fitting just inside said roof-support panels and one said stiffening bar, the under side of said roof panels being stiffened by angle irons welded thereto and having a second angle iron joined to one side of the stiffening angle iron and spaced from the other side to provide a groove, said panels being joined also by angle irons bridging between grooves of successive panels, said depending flange having a hook portion thereon; and clips comprising strips of metal with hooked ends linking the hook portion of said roof flanges to the upper said inclined brackets on said panels and linking the hook portion of said base receptacles to the lower said inclined brackets on said panels, whereby said building is assembled without screws, nails, or bolts.

7. A knockdown building comprising: a series of base receptacles of inverted T-shape in cross section, each with a central vertical groove in the vertical trunk thereof and having a hook-like flange along its upper inside edge; a series of panels joined together by interlocking side edges to define the four walls of the building and having upper and lower planar edges, said lower edges fitting in the grooves of said receptacles, and having upper and lower inclined brackets respectively adjacent said upper and lower edges; upper edge stiffening bars each having a groove open at its lower end and receiving the upper edges of said panels and stiffening them; a roof having a depending flange spaced in from its edges and fitting just inside the upper ends of the building walls, said depending flange having a hook portion thereon; and clips comprising strips of metal with hooked ends linking the hook portion of said roof flanges to said upper inclined brackets on said panels and linking the hook-like flange of said base receptacles to said lower inclined brackets on said panels.

8. A roof for a sheet metal building made up of a plurality of panels of sheet metal each having flat portions joined by V-groove-defining upwardly extending ribs, successive panels being joined by locking flanges and grooves, the undersides of said roof panels being stiffened by angle irons welded thereto, a second angle iron welded to one branch of said stiffening angle arm and spaced from the other branch to provide a groove, and a loose angle iron for joining said panels together by bridging between grooves of successive panels.

9. In a knockdown building, the combination of: a series of base receptacles of inverted T-shape in cross section each with a central vertical groove in the vertical trunk thereof and a hook-like flange along the upper inside edge; a series of integral sheet metal panels, each having a locking flange extending along one vertical edge and a locking groove along the other vertical edge, so that successive panels are joined together by interlocking a locking flange in a locking groove to define the four walls of the building, said grooves and flanges stopping short of a lower planar edge, said lower edges fitting in the grooves of said receptacles, said panels having a series of inclined brackets adjacent said lower edge; and clips comprising strips of metal with hooked ends linking the hook portion of said base receptacles to said inclined brackets on said panels.

10. In a knockdown building, the combination of: a series of integral sheet metal panels, each having a locking flange extending along one vertical edge and a locking groove along the other vertical edge, so that successive panels are joined together by interlocking a locking flange in a locking groove to define the four walls of the building, said grooves and flanges stopping short of an upper planar edge, said panels having a series of inclined brackets adjacent said upper and lower edge; upper edge stiffening bars having a groove open at its lower end receiving the upper edges of said panels and stiffening them; a sheet metal roof having a depending flange spaced in from its edges and fitting just inside the upper ends of the building walls, said depending flange having a hook portion thereon; and clips comprising strips of metal with hooked ends linking the hook portion of said roof flanges to said upper inclined brackets on said panels.

11. In a metal building, the combination of: a plurality of sheet metal wall panels, each panel comprising a single piece of sheet metal providing a plurality of flat wall portions joined to each other by an integral V-groove stiffening rib extending outwardly, each panel having an integral locking flange extending out perpendicularly along one vertical edge and an integral locking groove extending out perpendicularly along the other vertical edge, successive said panels being joined together by interlocking a locking flange in a locking groove, each said panel having lengthwise horizontal brackets secured along the lower edges of said brackets to the inside surface of said panel for a major portion of the length of said panel between the upper and lower edges of said panel to provide a pocket-like opening along the upper edge of said bracket, and angle irons with one portion slipped from above into said opening and bridging successive panels and linking all said horizontal brackets of the panels of each wall.

12. In a metal building, the combination of: a plurality of sheet metal wall panels each panel comprising a single piece of sheet metal having an integral locking flange extending out perpendicularly along one vertical edge and an integral locking groove extending out perpendicularly along the other vertical edge, successive said panels being joined together by interlocking a locking flange in a locking groove, each said panel having lengthwise pocket-like horizontal brackets secured along lower edges of said brackets to the inside surfaces of said panel between the upper and lower edges of said panel, and angle irons with one portion dropped into the pocket like brackets and linking all said horizontal brackets of the panels on each said wall.

13. A sheet-metal panel for a knockdown building, each panel comprising a single piece of sheet metal providing a plurality of flat wall portions joined to each other by an integral V-grooved vertical stiffening rib extending outwardly, each panel having an integral locking flange extending out perpendicularly along one vertical edge and an integral locking groove extending out perpendicularly along the other vertical edge, so that successive panels are joined together by interlocking a locking flange in a locking groove, and inclined brackets adjacent both the upper and lower edges of said panel, said brackets each providing a cam inclined with respect to said upper and lower edges.

14. In a knockdown building made from wall panels of sheet metal, upper edge stiffening bars comprising sheet-metal members formed to provide an inner groove open at its lower end, an outer groove open at its upper end and an outwardly extending horizontal strengthening bead, the inner groove receiving the upper edges of said panels and stiffening them, three roof support panels of sheet metal fitting in said outer grooves, one panel being rectangular and the other two being triangular to give pitch to a roof and having at the high ends of the triangular panels and at both ends of the rectangular panel, turned over edges providing locking means, and corner-locking members engaging said locking means and joining said rectangular panel to said triangular panels and with the lower ends in said outer grooves.

References Cited in the file of this patent

UNITED STATES PATENTS

| | | |
|---|---|---|
| 375,998 | Hodges | Jan. 3, 1888 |
| 502,552 | Detombay | Aug. 1, 1893 |
| 817,508 | Niele | Apr. 10, 1906 |
| 1,340,561 | Rowan | May 18, 1920 |
| 1,352,991 | Roure | Sept. 14, 1920 |
| 1,356,950 | Whittredge | Oct. 26, 1920 |
| 1,775,780 | Papalas | Sept. 16, 1930 |
| 1,833,174 | Norris | Nov. 24, 1931 |
| 2,050,074 | Trytten | Aug. 4, 1936 |
| 2,059,157 | Turner | Oct. 27, 1936 |
| 2,231,065 | Gabel | Feb. 11, 1941 |
| 2,277,791 | Small | Mar. 31, 1942 |
| 2,475,103 | Mannist | July 5, 1949 |
| 2,574,667 | Shuman | Nov. 13, 1951 |
| 2,664,177 | Hammitt et al. | Dec. 29, 1953 |
| 2,691,502 | Jones | Oct. 12, 1954 |
| 2,962,130 | Marsi | Nov. 29, 1960 |

FOREIGN PATENTS

| | | |
|---|---|---|
| 459,622 | Great Britain | Jan. 12, 1937 |